United States Patent

Zimmer et al.

Patent Number: 5,773,036
Date of Patent: Jun. 30, 1998

[54] DEVICE AND METHOD FOR EXTRUSION-COATING TUBES OR COMPOUND TUBULAR CONNECTION FITTINGS WITH RUBBER OR PLASTIC

[75] Inventors: Detlef Zimmer, Verl; Michael Ahlers; Dirk Stuhrmann, both of Hamburg, all of Germany

[73] Assignee: Phoenix Aktiengesellschaft, Hamburg, Germany

[21] Appl. No.: 549,859

[22] PCT Filed: Feb. 21, 1995

[86] PCT No.: PCT/DE95/00217

§ 371 Date: Feb. 1, 1996

§ 102(e) Date: Feb. 1, 1996

[87] PCT Pub. No.: WO95/23058

PCT Pub. Date: Aug. 31, 1995

[30] Foreign Application Priority Data

Feb. 23, 1994 [DE] Germany ............ 44 05 787.3

[51] Int. Cl.⁶ ..................................... B23B 3/00
[52] U.S. Cl. ................................. 425/125; 425/127
[58] Field of Search ................. 425/125, 127, 425/129.1

[56] References Cited

U.S. PATENT DOCUMENTS 4,676,532  6/1987  Gronau et al. ............ 285/156
5,356,587  10/1994  Mitsui ........................ 264/263

FOREIGN PATENT DOCUMENTS

| 0243216 | 7/1990 | European Pat. Off. . |
|---|---|---|
| 0564990 | 10/1993 | European Pat. Off. . |
| 1729336 | 7/1971 | Germany . |
| 32 39 623 | 4/1984 | Germany . |
| 37 13 064 | 11/1988 | Germany . |
| 37 29 056 | 3/1989 | Germany . |
| 38 29 665 | 3/1989 | Germany . |
| 41 02 700 | 8/1992 | Germany . |
| 4123256 | 10/1992 | Germany . |
| 5096629 | 4/1993 | Japan . |
| 5096629 | 8/1993 | Japan . |

*Primary Examiner*—David W. Wu
*Attorney, Agent, or Firm*—Collard & Roe, P.C.

[57] ABSTRACT

A device is useful for extrusion-coating a tube, or the connection zone of a tubular composite body, which zone has to be sealed, with rubber or plastic. The device is particularly useful for extrusion-coating a hose connection, which includes a connection pipe made of rubber or plastic, onto which the rubber or plastic hose section is pushed. It is essential that the device, in addition to the fixed molding tool contour with injection nozzles, has at least one, in particular at least two slide clamps per circumferential unit. This enables the sealing surface of the slide clamp substantially to have the contour of the surface of the article directly opposing it in the sealing zone.

6 Claims, 2 Drawing Sheets

DEVICE AND METHOD FOR EXTRUSION-COATING TUBES OR COMPOUND TUBULAR CONNECTION FITTINGS WITH RUBBER OR PLASTIC

BACKGROUND OF THE INVENTION

1. Field of the Invention

The invention relates to a device for extrusion-coating a tube, or the connection zone of a tubular composite body, which zone is to be sealed, with rubber or plastic (thermoplastic; thermoplastic elastomer), in particular for extrusion-coating a hose connection, comprising a connection pipe made of metal or plastic (e.g. polyamide), onto which the rubber or plastic hose section(s) is/are pushed.

2. The Prior Art

With respect to hose connections (e.g. molded hose branchings) using a connection pipe (e.g. a T-shaped piece of pipe), such hose connections being specified here as the main field of application, a comprehensive state of the art has developed heretofore, whereby reference is made, by way of example, to the following published references:

DE-A-32 39 623; DE-A-33 36 940; DE-A-37 13 904; DE-A-37 29 056; DE-A-38 29 665; DE-C-40 25 141; DE-A-41 02 700; EP-A-0 243 216; EP-A-0 564 990.

In conventional mold separation for producing the above hose connections, the hose is, within the zone of the connection pipe, pressed onto the pipe with pretension, so that during the injection molding, the hose is not displaced by the injection pressure, and compression of the coating can be obtained at the same time. Normally, this is accomplished via reduction of the diameter of the tool enveloping the article; i.e., the smaller the diameter the greater the pressure applied to the area. From this results greatest possible compression and fixation during the injection and dwell process steps. However, if such pretensioning is applied to a degree such that such sealing is successful, this may under certain circumstances lead to damaging of the hose within the clamping zone of the mold separation. At the same time, differences in the thickness of the wall of the hose lead to even more damage if a thicker wall is obtained. With decrease in the thickness of the wall, the required compression of the coating is not assured, and such decrease leads to change in the position of the hose and to excessive injections, which make the parts unusable.

SUMMARY OF THE INVENTION

In order to counteract such drawbacks, a device is proposed in accordance with the invention which, in addition to the fixed molding tool contour with injection nozzles, has at least one, particularly at least two slide clamps, whereby the sealing surface of the latter substantially has the contour of the surface of the article directly opposing it within the sealing zone.

It is particularly advantageous if two to six slide clamps are present, whereby the numerical data specified relate to one circumferential unit of the tube to be coated all around, or of the connection zone of a tubular composite body, said zone having to be sealed. Example: If three hose sections are pushed onto a T-shaped piece of pipe, there are three sealing zones and, therefore, also three circumferential units with respect to the slide clamps. With, for example four slide clamps per circumferential unit, the total device consequently has (3×4=12) slide clamps.

Usefully, hydraulically controlled slides are used as slide clamps. Such slides assure a relatively uniform pressing of the area if the stroke of displacement of said slides is capable of significantly falling short of the pretension diameter of the sealing contour; i.e., the slides run up on the sealing surface with a preselected hydraulic pressure and come to a standstill only after a desired area pressing (counterpressure) has been reached.

The slides exceed or fall short of the diameters in the sealing zone depending on the wall thickness of the hoses. In this way, a "hydro-rubber-elastic" pretension is obtained which, in addition, permits further variations of the area pressing through the preselected control pressure. At the same time, owing to such "hydro-rubber-elastic" pretension, damage of the hoses within the clamping zone is avoided, as are the frequently present fabric inserts, namely with greatest possible reproducibility of the injection and dwell parameters during the coating process. In addition, the premounted position of the hose is assured.

Additional useful embodiments of the device according to the invention are introduced in connection with the description of the figures.

A further object of the invention is to make available a method for coating a tube, or the connection zone of a tubular composite body to be sealed, with rubber or plastic, using the device according to the invention, whereby the following process steps take place:

opening the molding tool is opened, whereby all clamp slides are extended;

placing the part to be coated (e.g. T-shaped hose branching) in the mold;

closing the molding tool;

driving all slide clamps into the sealing position, whereby a pressure is built up;

injecting rubber or plastic into the molding tool via nozzles, whereby the slide pressure counteracts the injection pressure;

upon completion of the dwell phase, driving all slide clamps from the molding tool; and subsequently opening, the molding tool and removing the shaped article (e.g. coated molded hose branching).

BRIEF DESCRIPTION OF THE DRAWINGS

The invention is now explained on exemplified embodiments and by reference to schematic drawings, in which.

DETAILED DESCRIPTION OF PREFERRED EMBODIMENTS

Figure 1:
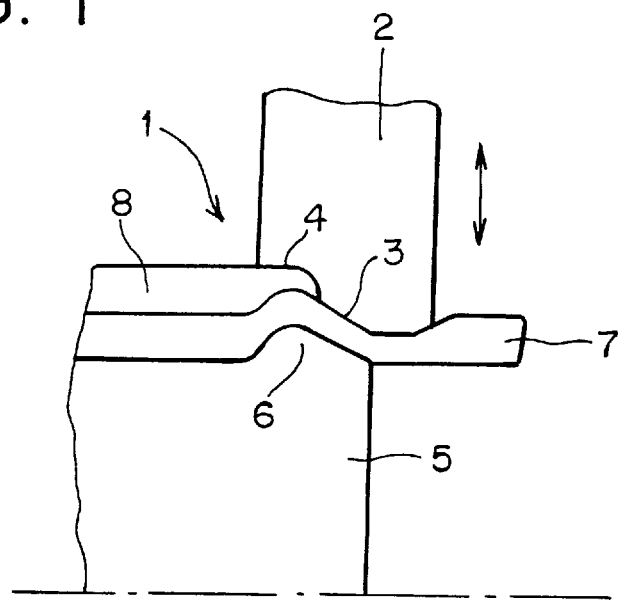
FIG. 1 shows a device with a hose connection placed in the tool, and with a retracted slide (representation of a longitudinal section)

FIG. 1 shows a device (molding tool) in the closed condition. In this connection, the entire device consists of the fixed molding tool contour (1), which has one or a plurality of injection nozzle(s). The slide clamp (2), which is movable in tho direction of the arrow, and retracted here, has a slide sealing surface (3), which substantially conforms to the contour of the surface of the article directly opposing it in the sealing zone, whereby the sealing surface of the slide is provided with an additional recess (4), into which the injection molding material (rubber or plastic) flows.

The finished hose connection as a shaped article consists of a connection pipe (5) made of metal or plastic, said pipe having a flange-like widening (6), as well as of the hose section (7) and the coating (8).

Figure 2:
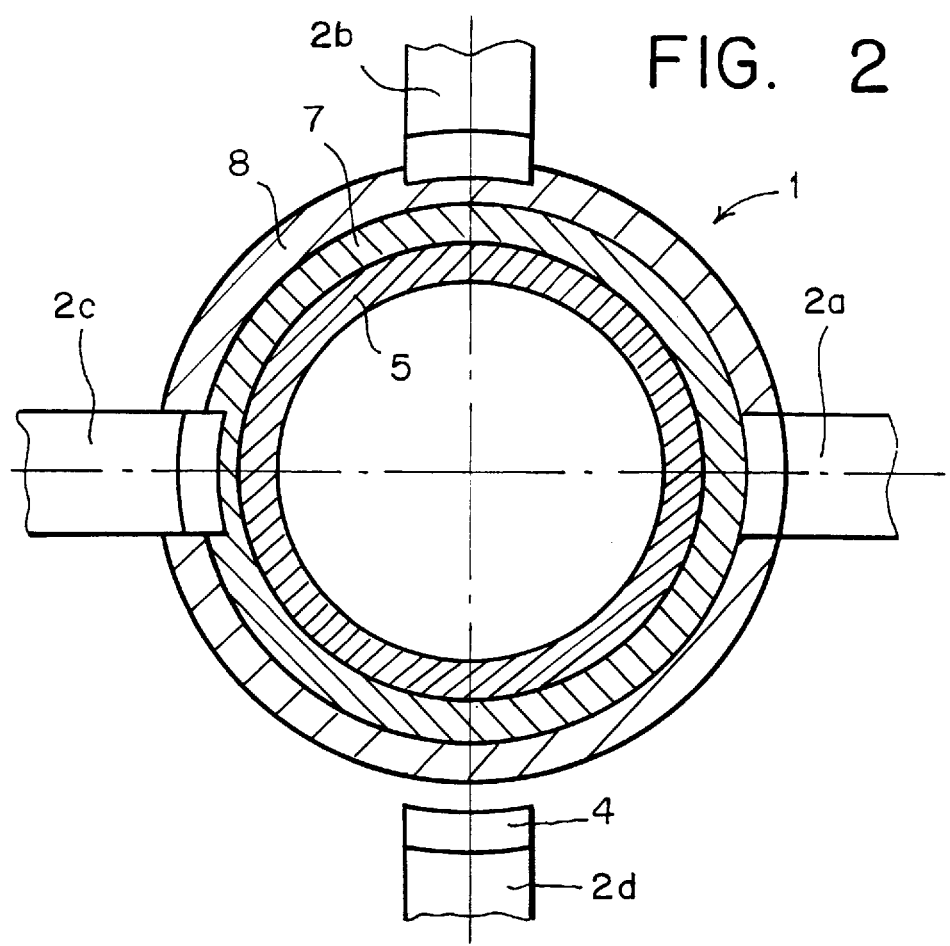
FIG. 2 shows a device with a hose connection placed in the tool, and with different slide positions (cross sectional representation)

FIG. 2 shows a cross-sectional view of the same hose connection as shown in FIG. 1, whereby different positions of the slide (2) are shown, namely in the closed position. The following is denoted:

(2a) slide retracted (position "zero" based on the surface of the hose;

(2b) slide retracted and not reached;

(2c) slide retracted and exceeded;

(2d) slide extended.

The slide position (2a) is useful in this connection. Also the position (2c) is acceptable, whereas the position (2b) is undesirable.

Even though the main field of application of the device and method according to the invention is based on the coating of hose connections, other articles can be produced in this way as well. Example: A tubular body, the surface of which must not be damaged, can be equipped with a shock or abrasion protection, or with connection elements etc.

Figure 3:
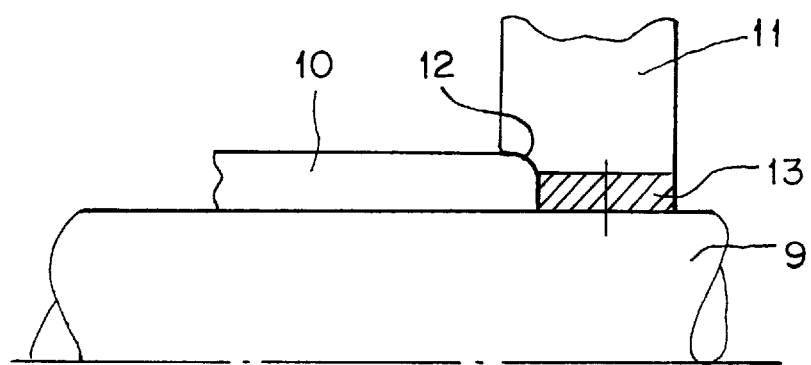
FIG. 3 shows a device with a tube placed in the tool, and with a retracted slide, the tool being fitted with an elastic sealing buffer (representation of a longitudinal section).

Now, such a case of application is shown in FIG. 3. A tube (9) is provided with a coating (10) all around. In this case, too, the slide (11) preferably has a recess. (12), into which the injection molding material flows. The sealing surface itself of the slide is usefully provided with an elastic sealing buffer (13), for example made of rubber or a rubber-like material, which, in connection with hydraulic slides, assures a "hydro-rubber-elastic" pretension as well.

What is claimed is:

1. Device for extrusion-coating a tube body with rubber or plastic, said body being a hose connection comprising a connection pipe made of metal or plastic, onto which a hose section made of rubber or plastic is extruded, comprising a fixed contour molding tool, and at least one movable slide clamp per circumferential unit, whereby a sealing surface of the slide clamp substantially has a contour of a surface of the body directly opposing the slide clamp in a sealing zone.

2. Device according to claim 1, wherein there are at least two slide clamps per circumferential unit.

3. Device according to claim 2, wherein there are two to six slide clamps per circumferential unit.

4. Device according to claim 1, further comprising hydraulic means for controlling the slide clamp.

5. Device according to claim 1, wherein the slide clamp has, within the zone of a sealing surface, a recess which is filled during injection molding.

6. Device according to claim 1, further comprising the sealing surface of the slide clamp has an elastic sealing buffer.

* * * * *